United States Patent [19]
Murakami

[11] Patent Number: 5,311,522
[45] Date of Patent: May 10, 1994

[54] ERROR CORRECTION AND/OR DETECTION DEVICE FOR PRODUCT CODE BLOCK DATA

[75] Inventor: Yoshihiro Murakami, Kanagawa, Japan

[73] Assignee: Sony Corporation, Tokyo, Japan

[21] Appl. No.: 71,932

[22] Filed: Jun. 4, 1993

Related U.S. Application Data

[63] Continuation of Ser. No. 521,370, May 10, 1990, abandoned.

[30] Foreign Application Priority Data

May 17, 1989 [JP] Japan ................................. 121435
May 17, 1989 [JP] Japan ................................. 121436

[51] Int. Cl.$^5$ ............................................ G11B 20/18
[52] U.S. Cl. .................................... 371/37.4; 360/53; 371/40.1
[58] Field of Search ................. 360/53; 371/37.4, 40.1

[56] References Cited

U.S. PATENT DOCUMENTS

| | | | |
|---|---|---|---|
| 4,447,902 | 5/1987 | Wilkinson | 371/37.4 |
| 4,653,051 | 3/1987 | Sugimura et al. | 371/37.4 |
| 4,918,694 | 4/1990 | Preissler | 371/37.4 |

OTHER PUBLICATIONS

Y. Hashimoto, H. Nakaya and T. Yoshinaka, "An Experimental HDTV Digital VTR with a Bit Rate of 1.188 Gbps," *IEEE Transactions on Broadcasting*, vol. BC-33, No. 4, Dec. 1987 pp. 203-209.

*Primary Examiner*—Stephen M. Baker
*Attorney, Agent, or Firm*—Lewis H. Eslinger; Jay H. Maioli

[57] ABSTRACT

An error correction and/or detection device for product code block data, applied to a digital video tape recorder of a so-called D1 or D2 format, is disclosed, in which the correction mode of the correction by the outer codes is selected and the correlation between correction states of inner code corrected outer code blocks as well as the correlation of the correction states between the product code blocks are checked to lower the rate of correction or detection errors.

1 Claim, 8 Drawing Sheets

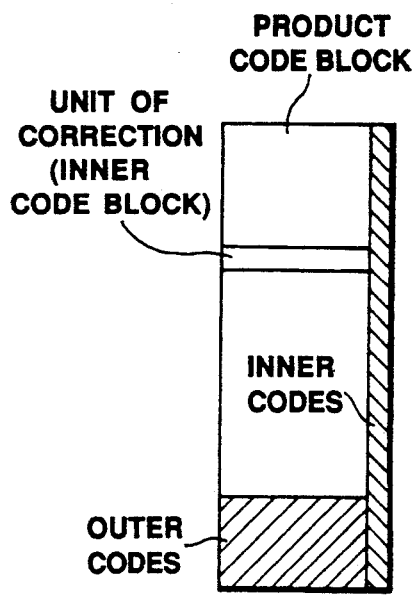
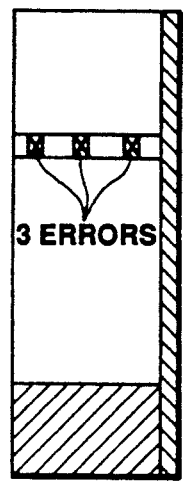
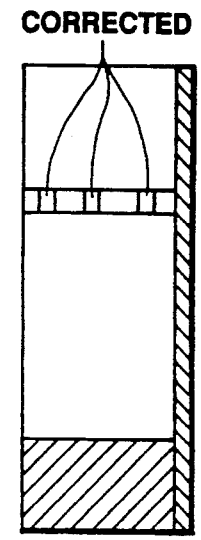
FIG. 4A  FIG. 4B  FIG. 4C
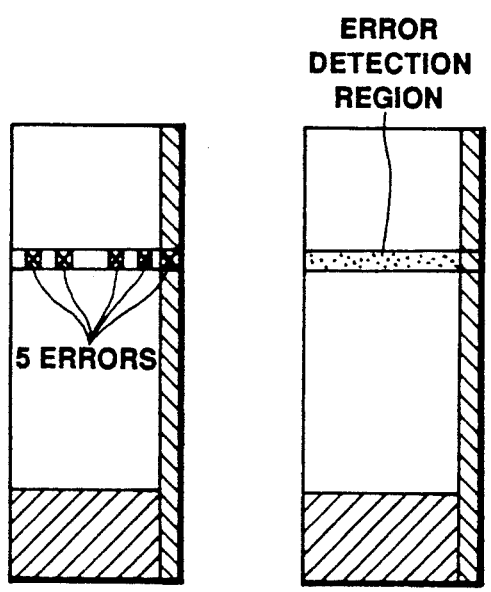
FIG. 5A  FIG. 5B

ERROR CORRECTION AND/OR DETECTION DEVICE FOR PRODUCT CODE BLOCK DATA

This is a continuation of application Ser. No. 07/521,370, filed May 10, 1990 now abandoned.

BACKGROUND OF THE INVENTION

1. Field of the Invention

This invention relates to a correction and/or detection device for product code block data applied to e.g. a so-called D1 or D2 format digital video tape recorder.

2. Description of the Prior Art

The formats for digital video tape recorders for recording video signals in a digital form include a so-called D1 format in which component signals of luminance and chrominance signals are digitized, and a so-called D2 format in which composite signals of the standard television systems, such as NTSC or PAL systems, are digitized directly. With the digital video tape recorder of the D1 or D2 formats, a product code system is adopted which enables a high error correcting ability by using inner and outer codes.

With the above D2 format digital video tape recorder, 8-bit-per-sample video data are handled in, for example, the NTSC system, in which video data have been sampled at the sampling frequency fs which is four times the subcarrier frequency fsc, or 4fsc. Referring to FIG. 1, one field is composed of 255 effective lines, with each line containing 768 samples of effective data, with the exclusion of horizontal sync signal portions. Thus the above video data are 768×255×8 bit data, with the exclusion of vertical sync signal portions. These video data are alternately allocated on a sample-by-sample basis to two channels, that is a channel 0 and a channel 1, while the 255 lines are divided into three equal segments 1, 2 and 3, each consisting of 85 lines. The video data are recorded and/or reproduced via six video tracks, as shown in FIG. 2.

With the D2 format digital video tape recorder, segment data are distributed to the respective channels, that is 768/2×85 byte data, are distributed, after shuffling, to six blocks each consisting of 64×85 bytes, as shown in FIG. 3A. Then, 4-byte outer codes for error correction and checking are annexed to each vertically extending 64-byte outer code block, as shown in FIG. 3B, and then 8-byte inner codes for error correction and checking are annexed to each horizontally extending 85-byte inner code block, as shown in FIG. 3C. Double error correction and checking may be realized in this manner by adopting the Reed-Solomon code with the inner codes (93, 85) and the outer codes (68, 64).

Six product code blocks, each composed of the annexed outer and inner codes and the data, constitute one video track, as shown in FIG. 3C, and the 85-line video data are recorded on the two video tracks, that is the channel 0 and channel 1 video tracks.

The manner in which recorded data are reproduced and the manner in which error correction and checking is performed by the product code will be hereinafter explained.

The error correction checking is performed with each product code block as a unit. Correction by the inner code is first made. Thus, correction with the inner code block as a unit is performed, as shown in FIG. 4A.

With the correction by the inner code, error correction can be made satisfactorily if the number of errors in one inner code block is up to three, as shown in FIGS. 4B and 4C. However, when the number of the errors in one inner code block is four or more, error correction cannot be made satisfactorily, and it is only detected that there are four or more errors in the inner code block. In this manner, error correction is made on all of the inner code blocks but, if error correction can not to be made, error detection is performed.

After the error correction by the inner code is terminated, error correction by the outer code is performed for correcting the portion which was unable to be corrected by the inner codes. This correction is performed with an outer code block shown in FIG. 6A as the correction unit. When the number of the regions which were unable to be corrected by the preceding correction by the inner code and which were detected as the regions containing the error is up to four within an outer code block as shown in FIG. 6B, complete error correction is made with the use of the results of detection obtained by the inner code correction. In this manner, all video data are corrected, as shown in FIG. 6c. To perform an outer code correction by employing the data of the error region, that is, the error flags obtained by the inner code correction, is known as erasure correction.

If, as a result of the correction by the inner code, five or more error flags indicating the detection of error regions are set, as shown in FIG. 7A, error correction by solely the outer code is performed, without having recourse to the results of error detection by the inner codes. Only the outer code blocks which have been detected as being free of errors are ultimately output as correct data.

When the video data are allocated to six blocks shown in FIG. 3, as described previously, the video data are scrambled by a prior shuffling, so that, even if several product code blocks are all in error, video data can be reconstituted by interpolation.

Meanwhile, when a so-called insert edition is performed on a prerecorded magnetic tape in a digital video tape recorder of the D1 or D2 format in which plural product code blocks are comprised in one track and the inner codes of the product codes are recorded on an end of the track, new data are recorded by overwriting old data without using an erasure head. In case of a failure in overwriting due to, for example, head clogging, old data are partially left as unerased data. Such failure in overwriting due to head clogging, for example, occurs for a longer period of time in the form of a burst such that the failure occurs across plural inner code correction blocks, as shown in FIG. 8A.

When the correction by the inner code is first made in this case, new data and old data exist together in the inner code blocks in which the start and end points of the unerased old data portions are located as in the example of FIG. 8A. Supposing that four or more data errors exist in the unerased data portions, error correction becomes infeasible, so that the error flag indicating the presence of four or more errors in the inner code block is output as the result of detection.

On the other hand, old data of the unerased portions are correct data per se, so that they cannot be detected as errors by the inner codes and hence are output in admixture with new data. In the conventional reproducing system, full trust was placed on the error flags of the inner codes and the outer code correction was performed only on the regions where the error flags were set in decoding the reproduced data. Thus the unerased old data portions where no error flags have been set in the course of the inner code correction, as shown in FIG. 8B, are directly output as error-free data.

When the data that have undergone the correction by the inner codes as shown in FIG. 8B are to be corrected by the outer codes, the error correction is made with the use of old data which are intrinsically error data, so that, as shown in FIG. 8c, correct data are handled as error data and mistakenly corrected.

Such malfunction occurs not only on the occasion of failure in erasure but also on the occasion of mistaken error detection or correction during correction by the inner codes.

In a digital audio tape (DAT) system, since the corrective capacity of the inner codes is fully utilized, a strategy is used in which the reliability of the error flags of the inner codes is checked by the outer codes or in which correction of the regions where no error flags are set is made by the outer codes. Although such error correction and detection is made solely by the outer codes and hence the detection probability is low, such low detection probability raises no particular problem since the mistaken correction occurs on only rare occasions and such mistaken correction, should it occur, is limited to one of the inner code blocks or to several samples in one inner code block.

However, since the failure in erasure occurs more frequently than the mistaken correction and since several inner codes may fail to be detected, the detection errors are likely to be produced unless the detection probability is raised. On the occurrence of an erasure, burst errors are likely to be produced in its vicinity. It is therefore more desirable that correction or detection of unerased data portions can be made even if the number of the error flags is increased to a more or less extent. In addition, if detection cannot be made because of the presence of an excessive number of error flags, unerased data portions would be directly output unless means are provided for detecting if there are any unerased data portions in the product code block. The above mentioned DAT system is primarily designed for error correction and, should the unerased data be detected in an error-free condition, the unerased data would be reproduced as the output.

Meanwhile, with the conventional D2 format digital video tape recorder making use of the Reed Solomon code with the inner codes (93, 85) and the outer codes (68, 64), the data of the unerased portions may or may not be detected as error depending on whether the number of errors in the product code block is not more than three or not less than four, respectively.

BRIEF SUMMARY OF THE INVENTION

In view of the foregoing, it is a principal object of the present invention to provide an error correction and/or detection device for product code block data in which data constructed as product code blocks are reproduced after inner code correction and outer code correction, wherein the probability of mistaken correction or detection is lowered for assuring a highly reliable data reproduction.

BRIEF DESCRIPTION OF THE DRAWINGS

FIGS. 4A, B and C are diagrammatic views for illustrating the inner code correction in the reproducing system of the digital video tape recorder.

FIGS. 5A and B are diagrammatic views for illustrating the error detecting operation during the inner code correction.

DETAILED DESCRIPTION OF THE PREFERRED EMBODIMENT

Figure 1:
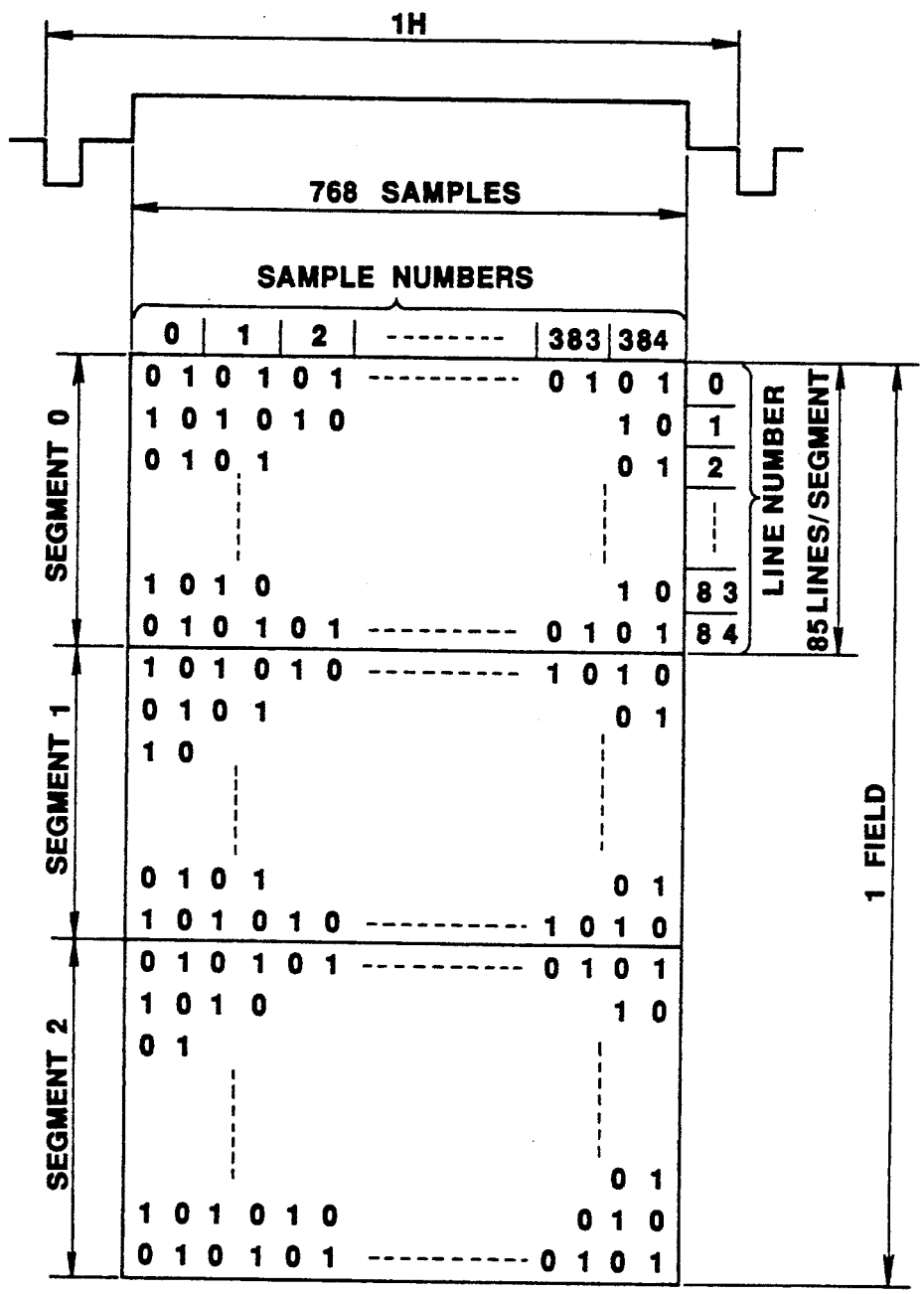
FIG. 1 shows a data arrangement for one field in a D2 format digital video tape recorder.
Figure 2:
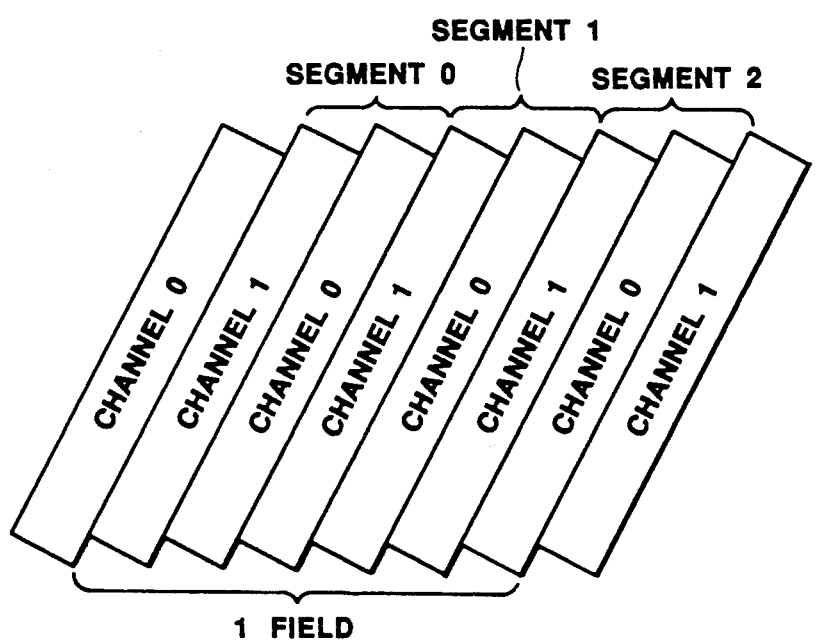
FIG. 2 shows a recording format in the digital video tape recorder shown in FIG. 1.
Figure 3A:
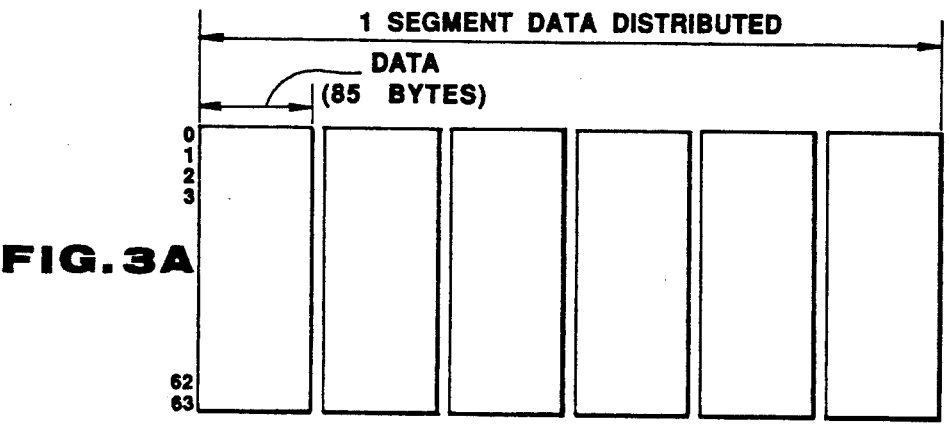
FIGS. 3A, B and C are diagrammatic views showing a data array for illustrating an error correction coding for one-segment data in a memory system of the digital video tape recorder.
Figure 3B:
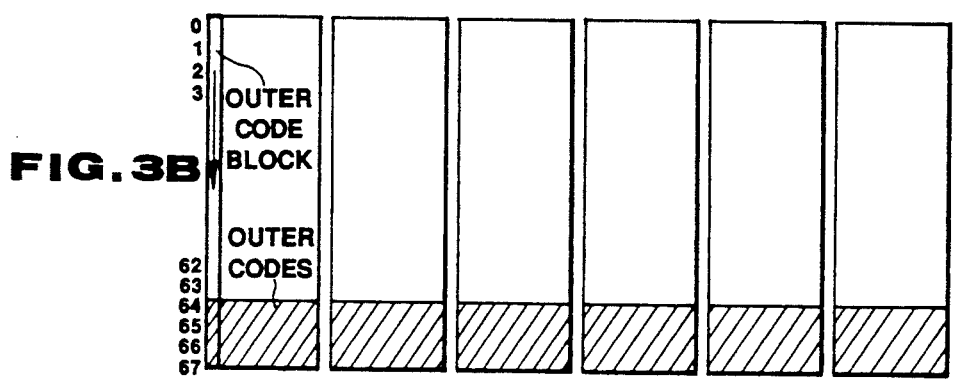
Figure 3C:
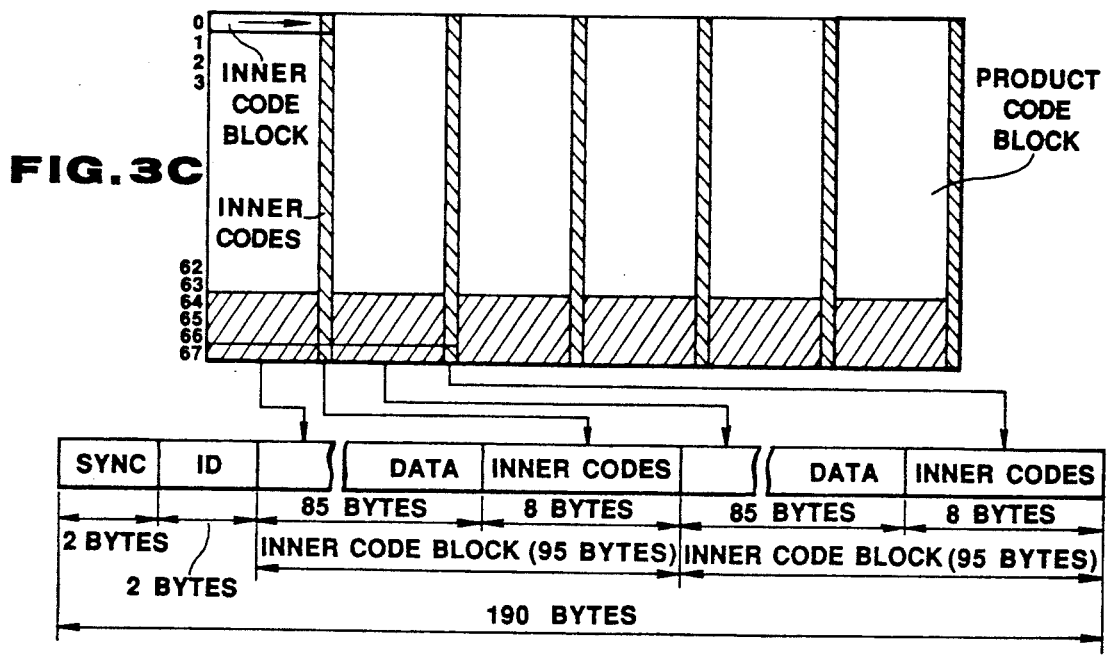
Figures 6A, 6B, 6C:
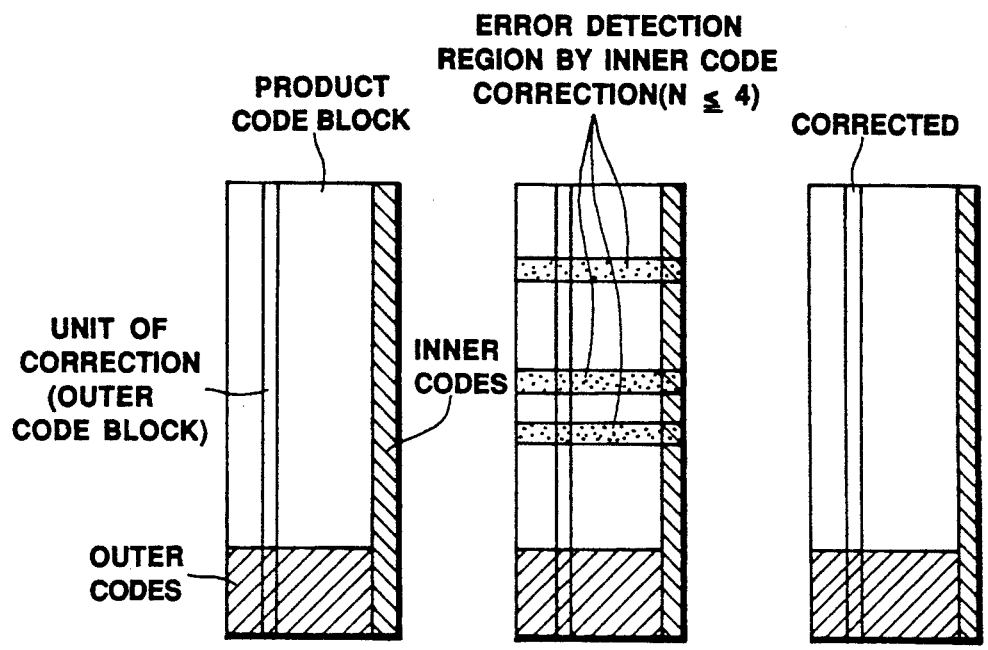
FIGS. 6A, B and C are diagrammatic views for illustrating the outer code correction in the reproducing system of the digital video tape recorder.
Figures 7A, 7B:
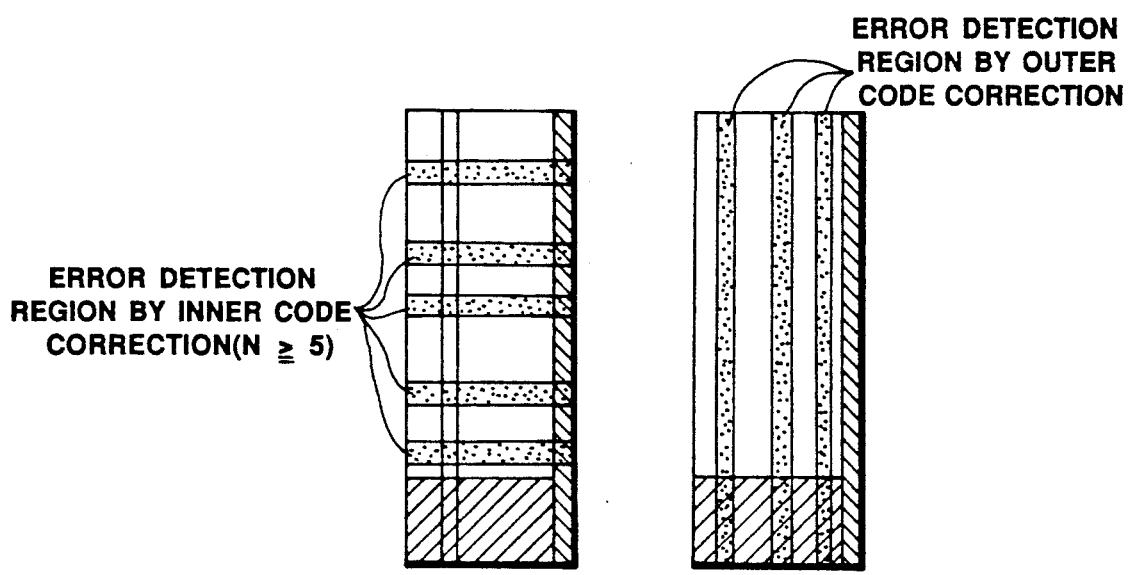
FIGS. 7A and B are diagrammatic views for illustrating the error detection during the outer code correction shown in FIGS. 6A to C.
Figure 8A:
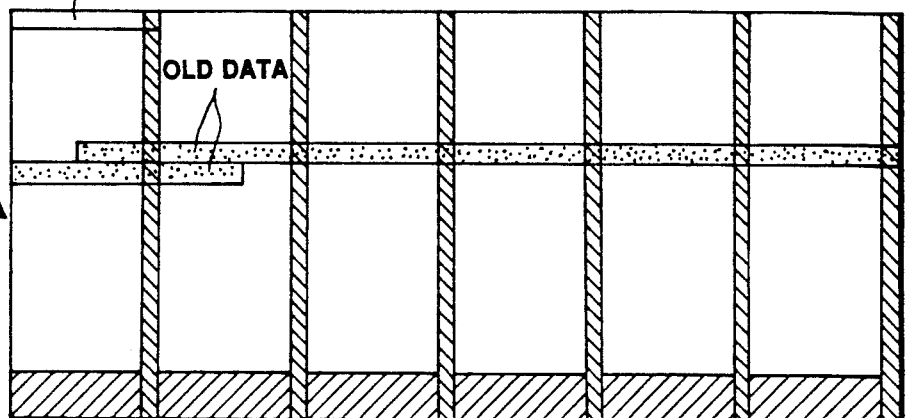
FIGS. 8A, B and C are diagrammatic views for illustrating the inner code correcting operation and the outer code correcting operation for the unerased data in the reproducing system of the digital video tape recorder.
Figure 8B:
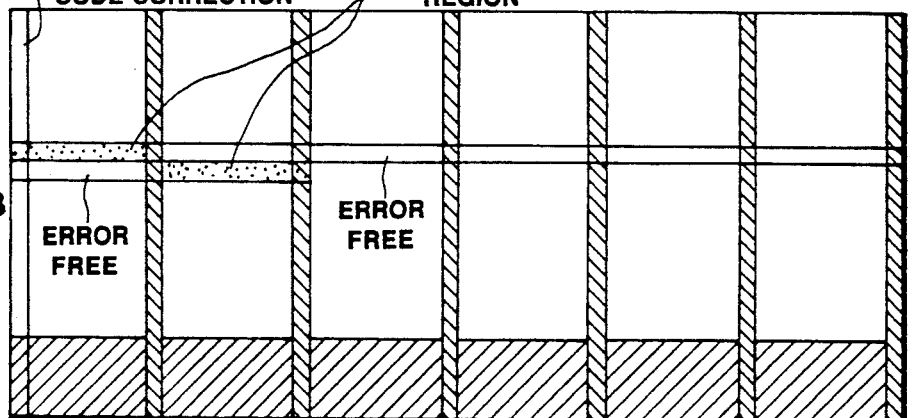
Figure 8C:
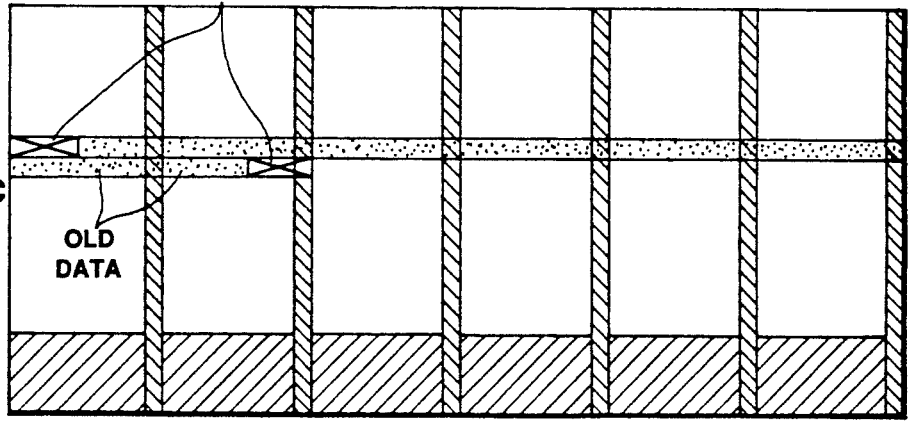

By referring to the drawings, an embodiment of the present invention in which a product code data processing device according to the present invention is applied to the reproducing system of the D2 format digital video tape recorder is explained in detail.

Figure 9:
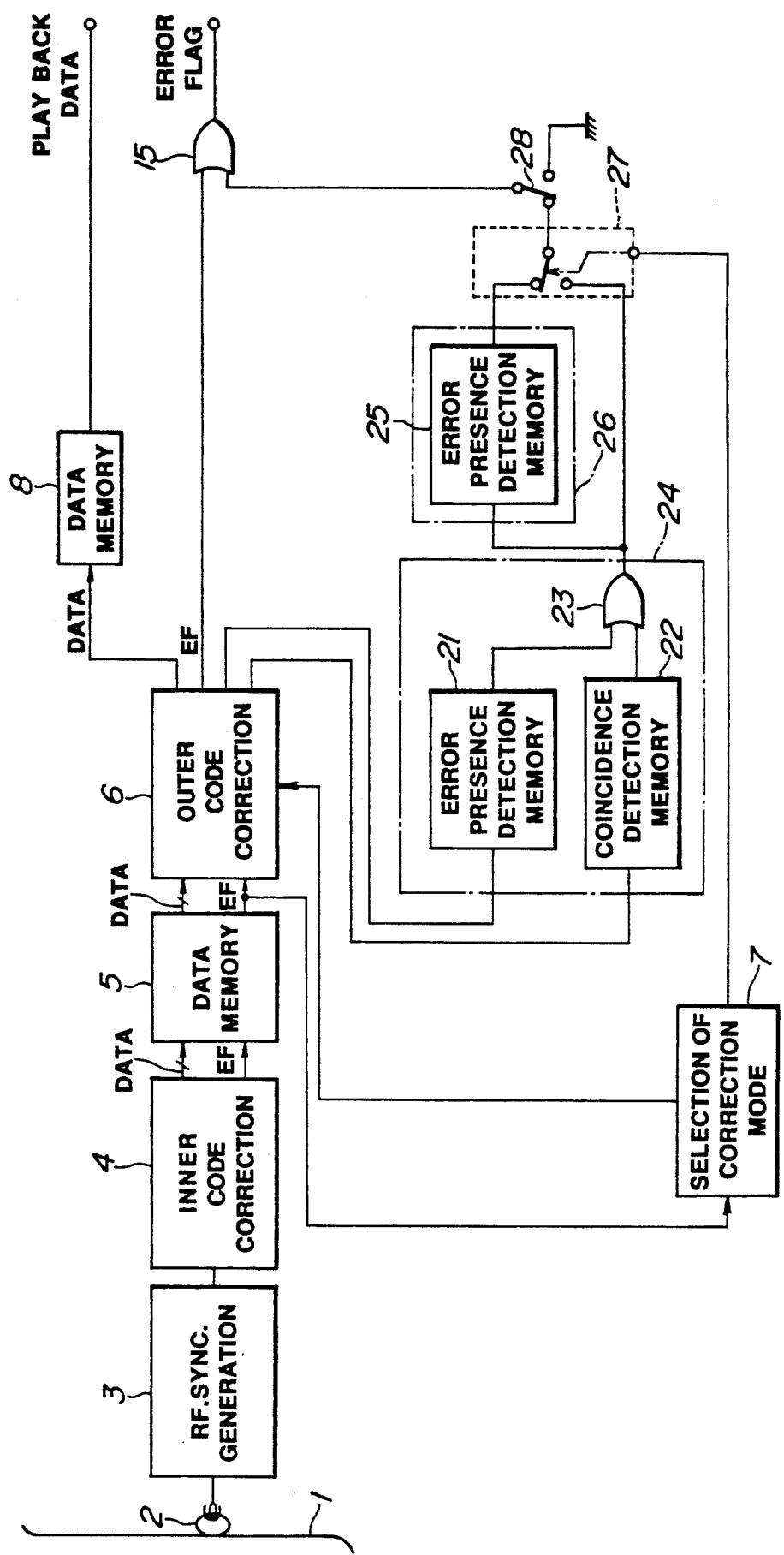
FIG. 9 is a block diagram showing an embodiment in which the present invention is applied to the reproducing system of the D2 format digital video tape recorder.

In the embodiment shown in the block diagram of FIG. 9, the detection output of the D2 format digital data, detected by a magnetic head 2 from a magnetic tape 1, are supplied to an inner code correction circuit 4, after detection by a RF-SYNC detecting circuit 3 triggered by sync data at the leading end of a data block.

The detected data are corrected for errors on the basis of the inner codes by the inner code correction circuit 4. The detected data supplied from the inner code correcting circuit 4 after inner code correction and the error flags output when correction has been unable to be made are stored sequentially in a data memory 5 and subsequently read out in a different reading direction so as to be supplied to an outer code correction circuit 6. The error flags output at the time of the inner code correction are supplied to a correction mode selection circuit 7 adapted for selecting the correction mode of the outer code correction circuit 6.

The correction mode selecting circuit 7 selects, using the total number N of the error flags of the detected and inner code corrected data within an outer code block, the outer code decoding mode, that is the correction mode of the outer code correction circuit 6, as shown in Table 1. The circuit 7 also supplies a control signal to a switch 27, which will be explained subsequently.

TABLE 1

| error flags | the outer code decoding mode |
| --- | --- |
| N = 0 | 2 error corrections |
| N = 1 | N erasure corrections + |
| N = 2 | 1 error correction |

TABLE 1-continued

| error flags | the outer code decoding mode |
|---|---|
| N = 3 | 3 erasure corrections + error detection |
| N = 4 | 4 erasure corrections |
| N > 4 | error detection |

As shown in Table 1, if the error flag indicating an area with an error from the inner error correction is not present in the outer code block, that is, if N=0, a mode in which up to two error corrections solely by the outer code are performed, is selected.

In this manner, even if the above mentioned unerased old data should remain undetected by the inner codes, the error can be corrected by the outer codes. If three or more errors exist in one and the same outer code block, the correction naturally cannot be made, in which case the outer code correcting circuit 6 outputs an error flag via an OR gate 15.

Similarly, when N=1 or N=2, a mode is selected in which an N number of erasure corrections are made using the results of detection of the inner code correction, that is, the data of the error flags, and one error correction is made by solely the outer codes.

When N=3, three similar erasure corrections are made, at the same time that an error detection is made solely by the outer codes. At this time, error correction solely by the outer codes can no longer be made, it being only possible to detect the possible presence of errors.

When N=4, four erasure corrections are made. When N>4, error correction is not made, but only the possible presence of the errors is detected.

The outer code correction circuit 6 reads out data once stored in the data memory 5, in the direction of the outer code block, to perform correction of the read out data on the basis of the outer codes using an outer code decoding mode selected by the correction mode selection circuit 7. The detected and outer code corrected data, supplied from the outer code correction circuit 6, are deshuffled by a data memory 8, before being output as reproduced data. In practice, the detected data corresponding to an error flag, output from an OR gate 15, are subjected to concealment by the surrounding data before being output as ultimate data.

The outer code correction circuit 6 outputs, via an OR gate 15, an error flag indicating by the logical "H" the presence of an error in the detected and inner code detected data. The circuit 6 also supplies a detection output via first memory 21 to an OR gate 23 for each product code block. This detection output indicates, by the logical "L", the state in which there are no errors in the results of error correction or detection in the totality of the product code blocks with N<3. The outer code correction circuit 6 issues a coincidence output to the OR gate 23 via second memory 22 for each product code block, which coincidence output indicates, by the logical "L", the state in which the error corrected regions are coincident in the totality of the outer code blocks with N<2.

Figure 10:
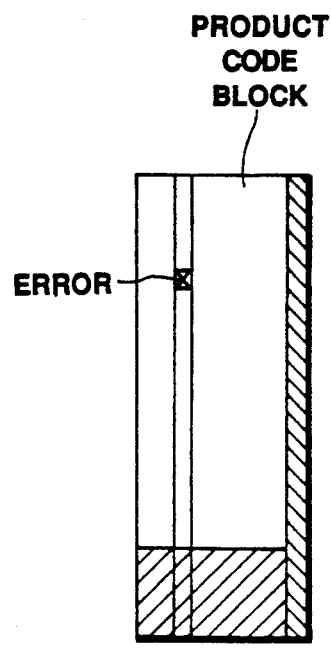
FIG. 10 is a diagrammatic view for illustrating the error detection by an error presence detection memory of the embodiment shown in FIG. 9.

Referring to FIG. 10, if one or more errors that cannot be corrected by the inner codes nor by the outer codes should exist in a product code block, the first memory 21 assumes that unerased old data exist in the product code block, and outputs an error flag via OR gate 23 and OR gate 15.

Figure 11A:
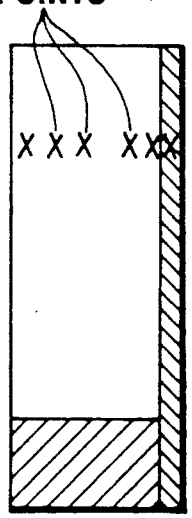
FIGS. 11A, B and C are diagrammatic views for illustrating the error detection by a coincidence detection memory of the embodiment shown in FIG. 9.
Figure 11B:
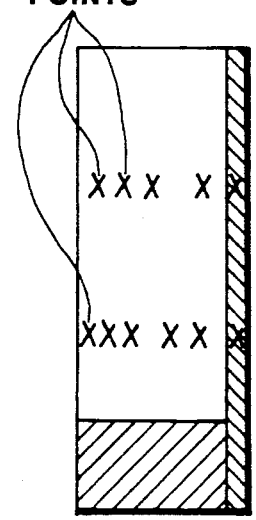
Figure 11C:
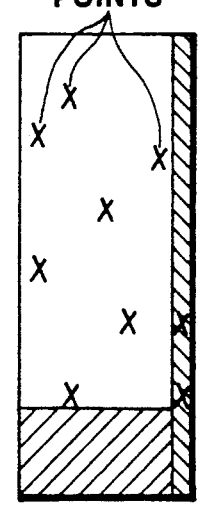

The second memory 22 determines, when it has performed an error correction solely by the outer codes, that is without using data of the error flags of the inner code, whether or not a correction point has any correlation with the correction point or points at other outer code block or blocks within the product code block. When there exists any correlation, as shown for example in FIGS. 11A and B, it is determined that the burst like unerased old data that has not been detected by the inner code correction has been properly corrected by the outer code correction, and a logical "L" signal is transmitted to the OR gate 23. However, when no correlation is seen in the correction points in the product code block, as shown in FIG. 11C, it is determined that erroneous correction has been made because of the presence of a large number of unerased old data surpassing the correction capacity in the product code block, and an error flag of the logical "H" is output via OR gates 23 and 15.

In this manner, the first and second memories 21 and 22 and the OR gate 23 constitute the above mentioned outer code block correction correlation detection section 24 adapted for checking the correlation of the correction states of the outer code blocks in the product code block.

The output of the OR gate circuit 23 represents the results of the detection of the inner code fetching errors of the product code block.

The output of the OR gate 23, that is the detection output by the outer code block correction correlation detection section 24, is supplied to a third memory 25 constituting the product code correction correlation detection section 26 adapted for checking the correlation of the correction states of the product code blocks. The output of the OR gate 23 is also supplied to the above mentioned switch 27.

The product code block correction correlation detection section 26 transmits to the switch 27 an output which goes to a logical "H" (high) when the detection output by the outer code block correction correlation detection section 24 of at least one of the six product code blocks constituting a track is at the logical "H".

The detection output from the outer code block correction correlation detection section 24 and the detection output from the product code block correction correlation detection section 26 are supplied via switch 27 to the OR gate 15.

The switch 27 is switched under control by a control output from the correction mode selection circuit 7 to select a detection output from the outer code block correction correlation detection section 24 when N≦3, while selecting a detection output from the product code block correction correlation detection section 25 when N≧4.

The reason is that, with N≧4, the outer code block correction correlation detection section 24 is no longer able to detect unerased old data. Therefore, for a product code block for which N≧4, the detection results of the remaining product code blocks in the same track are checked and, when unerased old data are determined to exist in at least one of the remaining five product code blocks, it is determined that the probability is high that the unerased old data similarly exist in such product code block. Thus an error flag is output from the third memory 25 via switch 27 and OR gate 15.

With N≦3, the outer code block correction correlation detection section 24 is able to detect the unerased old data as usual, so switch 27 has been shifted to the side of the OR gate 23.

A second switch 28 may be provided between the switch 27 and the OR gate 15 so that one of the inputs to the OR gate 15 may be forcedly grounded to provide a mode in which the error flag may be directly output from the outer code correction circuit 6 via OR gate 15.

In the above described reproducing system of the digital video tape recorder, with the total number N in the outer code block of error flags of the reproduced data which have been subjected to inner code correction by the inner code correction block 4, an error flag which is directly output when the error corrections in the totality of the outer code blocks are less than 2 and when the correction points are the same in the product code blocks and which indicates a block error otherwise is output from the OR gate 15. When N=1 or N=2, an error flag which is directly output when the error correction in the totality of the outer code blocks is not more than one and the correction points are the same within the product code block and which indicates a block error otherwise is output from the OR gate 15. When N=3, an error flag which is directly output when the error detection in the totality of the outer code blocks is not more than zero and which indicates a block error otherwise is output from the OR gate 15. When N≧4, an error flag which is directly output when all of the six product code blocks constituting the same track are free of the inner code fetching errors and which indicates a block error otherwise is output from the OR gate 15 on the basis of the above mentioned control output obtained from the correction mode selection circuit 7.

In this manner, the correction mode in the outer code correction circuit is selected as a function of the number of error flags in the inner code corrected data and the correlation of the corrected states of the outer code corrected data from one outer code block to another is checked within the product code block to detect the inner code fetching error in the product code block to lower the rate of correction errors or detection errors. Additionally unerased old data can be detected using the results of detection of unerased old data in the remaining product code blocks in the same track.

In this manner, in a D1 or D2 format digital video tape recorder in which a plurality of product code blocks are formed in one track and the inner codes of the product code blocks are recorded on the end of the track, data errors caused by unerased old data produced at the time of so-called insert editing of a previously recorded magnetic tape may be detected easily and reliably.

What is claimed is:

1. An error detection and correction device for product code block data comprising:

reproducing means for reproducing from a recording medium input data composed of a plurality of product code blocks formed on a recording track of said recording medium, with each product code block comprising inner codes and outer codes for error correction annexed to said input data;

inner code correction means for subjecting the reproduced input data to a first error correction by said inner codes for each of a plurality of inner code blocks and for outputting an error flag indicating that the inner code corrected data and error data uncorrected by the inner codes exist together;

correction mode selection means for selecting a correction mode depending upon then umber of error flags output by said inner code correction means;

outer code correction means for subjecting the inner code corrected data to second error correction by said outer codes for each of a plurality of outer code blocks depending upon the selected correction mode for outputting the outer code corrected data;

first correlation detection means for checking the correlation between correction points of said outer code corrected data by said second error correction for each of said plurality of outer code blocks belonging to the same product code block and for determining whether the data in said product code block comprises unerased old data; and second correlation detection means for detecting, when the number of error flags in a given product code block is not less than a predetermined value, whether another product code block determined by said first correlation detection means to comprise unerased old data exists in the same recording track and, if the result of such detection is affirmative, determining that the data in said given product code block also comprises unerased old data.

* * * * *

UNITED STATES PATENT AND TRADEMARK OFFICE
CERTIFICATE OF CORRECTION

PATENT NO. : 5,311,522
DATED : May 10, 1994
INVENTOR(S) : Yoshihiro Murakami

It is certified that error appears in the above-indentified patent and that said Letters Patent is hereby corrected as shown below:

col. 7, line 40, after "Additionally" insert --,--

Col. 8, line 21, change "then umber" to --the number--

Signed and Sealed this

Fourth Day of July, 1995

*Attest:*

BRUCE LEHMAN

*Attesting Officer*     *Commissioner of Patents and Trademarks*